United States Patent
Nowottnick et al.

(10) Patent No.: US 9,643,571 B2
(45) Date of Patent: May 9, 2017

(54) FIELD MEASUREMENT COMPENSATION

(71) Applicant: NXP B.V., Eindhoven (NL)

(72) Inventors: Juergen Nowottnick, Hamburg (DE); Thomas Klaus Rudolph, Hamburg (DE); Tobias Pilsak, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/270,954

(22) Filed: May 6, 2014

(65) Prior Publication Data

US 2015/0321643 A1 Nov. 12, 2015

(51) Int. Cl.
*B60R 25/24* (2013.01)
*H04W 4/00* (2009.01)
*H04L 29/08* (2006.01)
*H04W 88/08* (2009.01)
*H04W 24/08* (2009.01)
*G07C 9/00* (2006.01)

(52) U.S. Cl.
CPC ........ *B60R 25/245* (2013.01); *G07C 9/00309* (2013.01); *H04L 67/12* (2013.01); *H04W 4/005* (2013.01); *H04W 24/08* (2013.01); *H04W 88/08* (2013.01); *G07C 2209/63* (2013.01)

(58) Field of Classification Search
CPC .............. B60R 25/245; G07C 9/00309; G07C 2209/63; H04L 67/12; H04W 4/005; H04W 24/08; H04W 88/08
USPC ............ 340/426.11, 426.16, 426.17, 426.35, 340/426.36, 5.1, 5.2, 5.6, 5.61, 5.64, 5.7, 340/5.72, 10.1
See application file for complete search history.

(56) References Cited

U.S. PATENT DOCUMENTS

| 8,232,863 | B2 | 7/2012 | Nakajima et al. |
| 8,872,620 | B2 | 10/2014 | Higemoto et al. |
| 8,907,762 | B2 | 12/2014 | Kawamura et al. |
| 9,396,596 | B2 | 7/2016 | Park |
| 2006/0114100 | A1* | 6/2006 | Ghabra ............ E05B 81/78 340/5.61 |
| 2006/0176147 | A1* | 8/2006 | Pohlmann ........... B60R 25/24 340/5.61 |
| 2007/0162191 | A1 | 7/2007 | Matsubara et al. |

(Continued)

FOREIGN PATENT DOCUMENTS

| CN | 101798888 A | 8/2010 |
| CN | 102398566 A | 4/2012 |

(Continued)

OTHER PUBLICATIONS

Extended European Search Report for EP Patent Appln. No. 15165095.9 (Sep. 17, 2015).

*Primary Examiner* — Brian Wilson

(74) *Attorney, Agent, or Firm* — Rajeev Madnawat

(57) ABSTRACT

A system and method of locating a key are disclosed. The key is configured to communicate with a base station through a plurality of antennas that are coupled to the base station. The method includes turning off each of the plurality of antennas, turning on one of the plurality of antennas, measuring a first received signal strength, turning off the one of the plurality of antennas and measuring a second received signal strength. The key is determined to be located within a predefined area if the difference between the first received signal strength and the second received signal strength is above a preset threshold.

9 Claims, 3 Drawing Sheets

(56) References Cited

U.S. PATENT DOCUMENTS

2012/0154114 A1* 6/2012 Kawamura ........... B60R 25/245
340/5.63
2012/0286926 A1* 11/2012 Higemoto ............... B60R 25/24
340/5.61

FOREIGN PATENT DOCUMENTS

| CN | 102542644 A | 7/2012 | | |
|---|---|---|---|---|
| CN | 104134251 A | 11/2014 | | |
| EP | 2 216 756 A2 | 8/2010 | | |
| EP | 2 465 737 A2 | 5/2012 | | |
| JP | 2009-078596 A | 4/2009 | | |
| JP | 2010-023745 A | 2/2010 | | |
| JP | 2010-181295 A | 8/2010 | | |
| JP | EP 2216756 A2 * | 8/2010 | ........... | B60R 25/245 |
| JP | EP 2465737 A2 * | 6/2012 | ......... | B60R 25/2072 |

* cited by examiner

FIELD MEASUREMENT COMPENSATION

BACKGROUND

Wireless communication technology has proliferated into many types of systems and applications such as automobile electronics applications and systems. A device that supports wireless communication includes a wireless receiver and an antenna. Generally, in a wireless receiver, a high-frequency radio signal from an antenna is firstly converted into a signal with an intermediate frequency (IF signal), and then the IF signal is amplified and inputted to a detector. In the detector, a desired signal process, namely, a detection process in which information included in the radio signal is taken out is performed. In this detection process, the gains of the radio signal and the IF signal are set according to signal strength of the electric wave received by the wireless receiver, so as to be in a range in which the detection process can be desirably performed. The signal strength of an electric or magnetic wave is generally referred to as a received signal strength indicator (RSSI), and measured by an RSSI circuit system.

Keyless entry systems are becoming increasingly prevalent at least in the automobile industry. A keyless entry system primarily includes a base station and a key fob. The base station communicates with the key fob wirelessly. Security codes are employed to prevent unauthorized communication as for example, a base station will respond to requests only from a keyless entry key programmed to be associated with that particular base station. With keyless entry system, a mechanical key to open doors, for example, is not needed. The key typically includes a few buttons that are preprogrammed or can be programmed to send a preprogrammed set of instructions to the base station to perform specific operations. For example, a button may be programmed to lock or unlock automobile doors or start the engine.

The keyless entry systems key typically includes a base station that communicates with the key fob. The key fob includes an electronic circuit that sends and receives communication signals to/from the base station that is located inside the automobile. The term automobile is used generally. The description provided in this document may equally apply to other types of machines as well. The base station is programmed to communicate with the control systems of the automobile to effectuate performance of requests received from the key fob.

In a keyless or passive key system based automobile, typically the key simply need to be inside the automobile in order for a user of the automobile to operate the automobile. The key detection within the automobile compartment is typically performed through RSSI measurements. Therefore, it is necessary that RSSI measurements are performed accurately.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method of locating a key is disclosed. The key is configured to communicate with a base station through a plurality of antennas that are coupled to the base station. The method includes turning off each of the plurality of antennas, turning on one of the plurality of antennas, measuring a first received signal strength, turning off the one of the plurality of antennas and measuring a second received signal strength. The key is determined to be located within a predefined area if the difference between the first received signal strength and the second received signal strength is above a preset threshold.

In another embodiment, a system is disclosed. The system includes an electronic key, a base station, and an antenna that is electrically coupled to the base station. The base station is configured to execute a received signal strength measurement sequence that includes instructing the electronic key to measure a received signal strength of a signal received from the antenna, turning the antenna off, and instructing the electronic key to measure the received signal strength of a signal received from sources other than the antenna.

In yet another embodiment, a computer readable media including programming instructions executable in a vehicle to perform an operation to locate a key is disclosed. The key is configured to communicate with a base station through a plurality of antennas that are coupled to the base station. The operation includes turning off each of the plurality of antennas, turning on one of the plurality of antennas, measuring a first received signal strength, turning off the one of the plurality of antennas, measuring a second received signal strength, and allowing an operation to be performed if the difference between the first received signal strength and the second received signal strength is above a preset threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

DETAILED DESCRIPTION

Key localization is an important feature of a keyless start system, e.g., Passive Key Entry (PKE) and Passive Key Start (PKG). A vehicle, for example, that uses a keyless start system, does not require a key to be physically inserted into a key hole in order to start the vehicle. Instead, a detection sequence is perform to determine if the key is inside the vehicle compartment in order to allow the vehicle to be operated.

Figure 1:
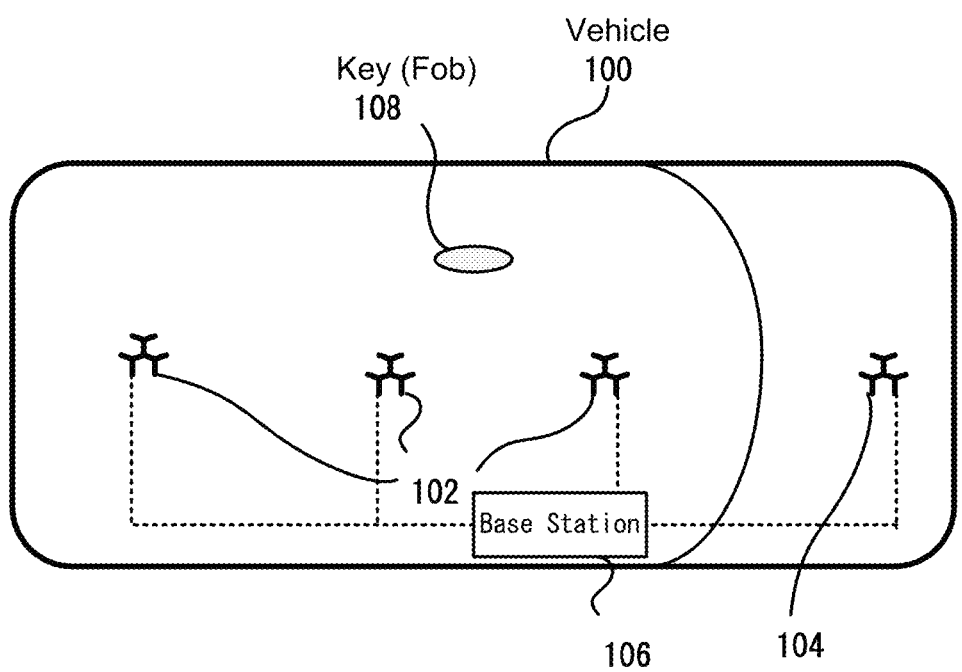
FIG. 1 is a schematic of a system including a base station and a plurality of antennas.

FIG. 1 is a schematic of a vehicle 100 including a base station 106 and a plurality of antennas 102 mounted inside the passenger compartment of the vehicle 100. One or more antennas 104 may also be mounted outside the passenger compartment of the vehicle 100. The inside antennas 102 and the outside antennas 104 (if any) are coupled to the base station 106, that in turn may be coupled to a vehicle control system (not shown). Note that the vehicle 100 is being used merely as an example. The embodiments described herein can be used in non-automobile applications in which a remote key is used to perform certain operations.

A key fob 108 is configured to enable a user to start the vehicle 100. The key fob 108 includes a transponder (not shown). However, in one example, the vehicle 100 is configured to allow the user to start the vehicle only when the key fob 108 is physically present inside the passenger compartment. In order to determine if the key fob 108 is present inside the passenger compartment, the key fob 108 and the base station 106 are configured to perform received signal strength indicator (RSSI) measurements using the plurality of inside antennas 102. Typically, the location of the key fob 108 is determined based on measured RSSI values. The key fob 108 and the base station 106 are pre-calibrated such that a RSSI value more than a pre-selected value would indicate that the key fob 108 is physically present within the passenger compartment of the vehicle 100. A second RSSI threshold may include a RSSI value that is lower than the first threshold RSSI value but higher than a second preselected threshold value. This second threshold may be used to determine if the key is outside the passenger compartment but in a close proximity thereof. In one example, if the measured RSSI value is higher than the second threshold RSSI but lower than the first preselect threshold value, the vehicle 100 doors may be allowed to be opened whereas if the measured RSSI value is higher than the first preselected threshold value, the engine of the vehicle 100 may be allowed to be started.

The RSSI measurements are typically performed at the key fob 108 according to a measurement sequence. In order to find an approximate location of the key fob 108, each of the inside antennas 102 and each of the outside antennas 104 (if any) are used sequentially according the measurement sequence configured in the base station 106. In some embodiments, each of the antennas 102, 104 may include 3D-coils to determine the x-, y- and z-axes of the key fob 108. The 3D-coil (not shown) helps determine the spatial orientation of the key fob 108. Note that the key fob 108 may have a random orientation during the RSSI measurements. Therefore, a 3D LF antenna may be needed to measure all field components. It should also be noted that three inside antennas 102 and one outside antenna 104 are shown in FIG. 1 merely as an example. In one embodiment, the antennas 102 are placed inside the passenger compartment of the vehicle 100 to cover the most common placements of the key fob 108 such as seats, glove box, etc. Typically, three antennas 102 are sufficient for detecting the location of the key fob 108.

During a standard RSSI measurement sequence, the base station 106 transmits a constant carrier via the antennas 102, 104 (if any). The field strength of this constant carrier of an antenna is measured by the RSSI sequence. The location of the key fob 108 can be determined based on the measured signal strength. However, these RSSI measurements result may be influenced due to the presence of a disturber (certain frequency, amplitude and bandwidth) is present. In some scenarios, a presence of the disturber may lead to higher or smaller RSSI results comparing to the undisturbed measurement, depending on the frequency and phase of the disturber. Such inaccuracies in measurements may lead to undesirable outcomes such as a third person may be able to start the vehicle 100 when the key fob 108 is not present in the passenger compartment of the vehicle 100.

Figure 2:
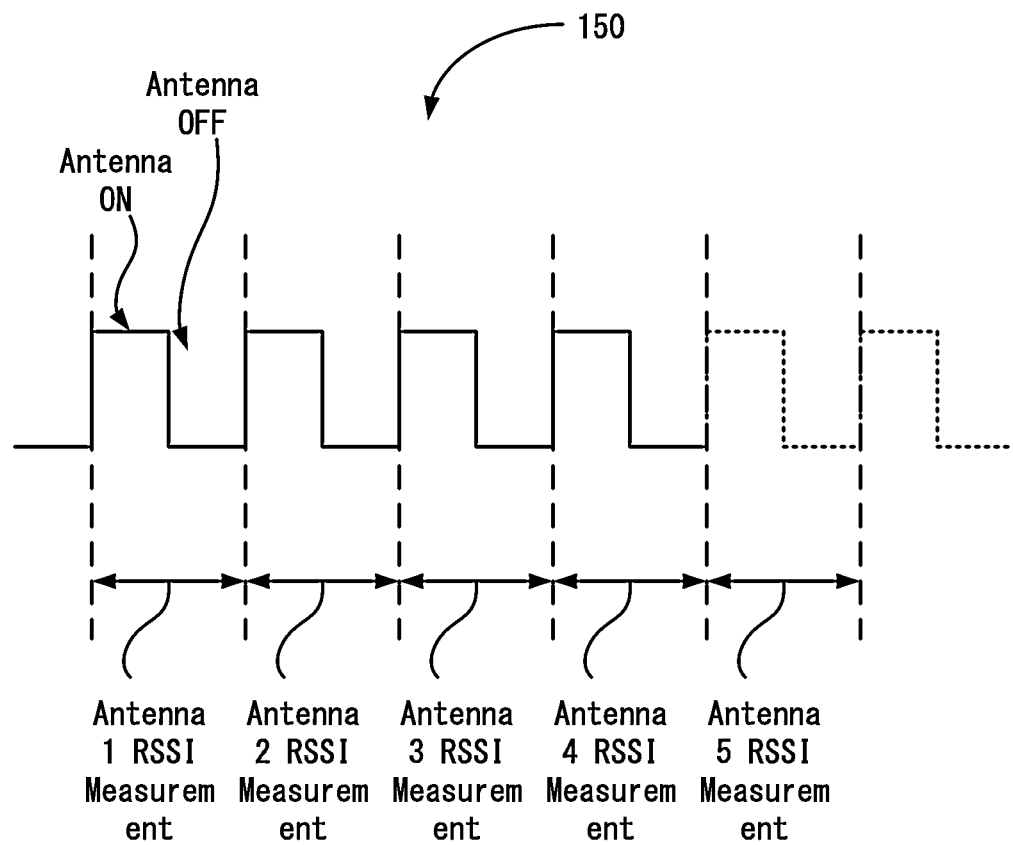
FIG. 2 illustrates an exemplary RSSI measuring sequence.

FIG. 2 illustrates an exemplary RSSI measurement sequence 150. In one embodiment, the base station 106 is configured to execute this RSSI measurement sequence 150. In other embodiments, the RSSI measurement sequence 150 may be controlled and executed by the central control unit of the vehicle 100. At the start of the RSSI measurement sequence 150, all antennas 102, 104 are turned off. Note that the vehicle 100 may include other types of antennas that are not used for communication with the key fob 108. These other antennas are not turned off prior to executing the RSSI measurement sequence 150. The RSSI measurement sequence 150 may be executed repeatedly at pre-selected intervals. However, in some embodiments, the RSSI measurement sequence 150 is executed only when the vehicle 100's engine is off.

At the beginning of the RSSI measurement sequence 150, antenna 1 in the plurality of antennas 102, 104 is turned on (while all other antennas in the plurality of antennas 102, 104 are turned off). The base station 106 sends a signal to the key fob 108 to measure the RSSI (Reading 1). Antenna 1 is then turned off and the key fob 108 is instructed to measure the RSSI again (Reading 2). This process is repeated for other antennas in the plurality of antennas 102, 104, one antenna at a time. In one embodiment, Reading 2 is performed only once during the RSSI measurement sequence 150.

In one embodiment, the key fob 108 is configured to send Reading 1 and Reading 2 back to the base station 106. In another embodiment, the key fob 108 is configured to subtract Reading 2 from Reading 1 for each antenna and send the result of the subtraction back to the base station 106.

As evident, Reading 2 primarily captures RSSI due to external noise because no antennas 102, 104 are on when Reading 2 is measured. Therefore, the result of the subtraction of Reading 1 and Reading 2 provides an accurate RSSI reading for the key fob 108.

In one example, at the end of the RSSI measurement sequence 150, the base station 106 compares net RSSI measurement values (Reading 1-Reading 2) for each antenna. The key fob 108 is determined to be the nearest to the antenna that resulted in the highest net RSSI measurement value. The antennas produce a magnetic field covering both the passenger compartment of the vehicle 100 and the immediate vicinity outside the passenger compartment of the vehicle 100. Based on a preset threshold RSSI value for the antenna that provided the highest net RSSI measurement value, a determination can be made if the key fob 108 is inside the passenger compartment of the vehicle 100 or outside. Note that the preset threshold RSSI value is typically determined through the key fob 108 calibration steps and configured in the base station 106. Typically, this threshold RSSI value is the measurement of the RSSI when the key fob 108 is placed near the outer periphery of the passenger compartment of the vehicle 100.

Figure 3:
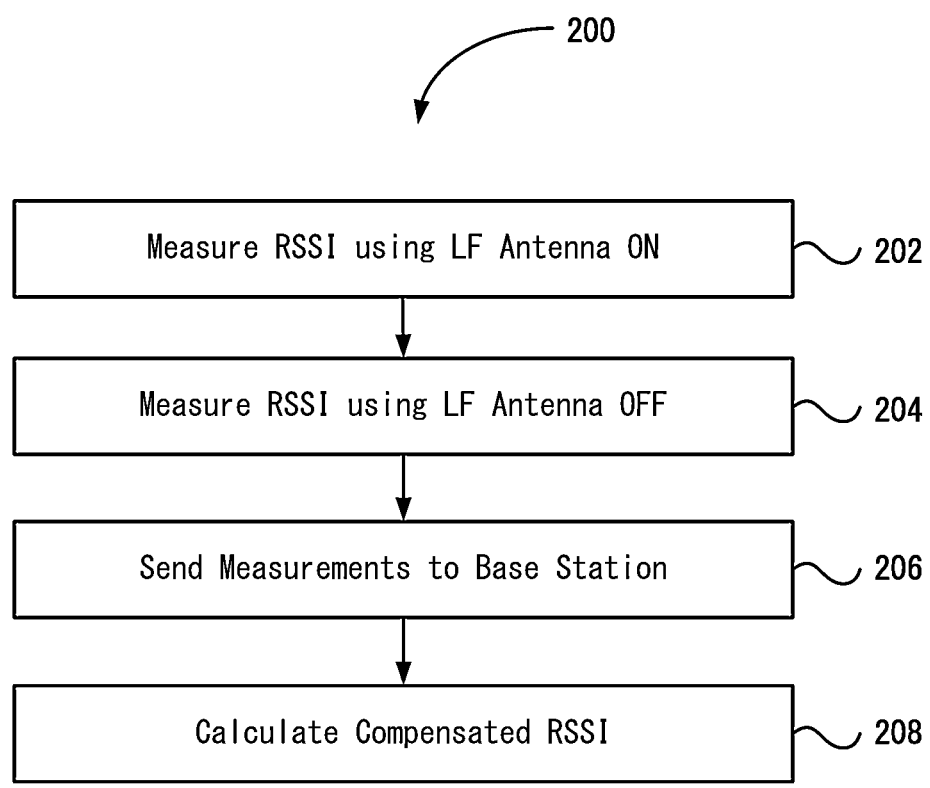
FIG. 3 illustrates an exemplary method of measuring RSSI in accordance with one or more embodiments of the present disclosure.

FIG. 3 is an exemplary method 200 of measuring RSSI according to the one or more embodiments described herein. Accordingly, at step 202, a RSSI measurement is performed by the key fob 108 when only one antenna 102 is on. The antenna is then turned off and at step 204, another RSSI measurement is performed by the key fob 108. At step 206, the key fob 108 sends both values to the base station 106. Alternatively, the key fob 108 subtract the RSSI value measured with the antenna off from the RSSI value measured with the antenna on and sends the result of the subtraction to the base station 106. If the key fob 108 sends both values to the base station 106, at step 208, a compensated RSSI value is calculated by the base station 106 through the subtraction of the received values.

It should be noted that measuring errors introduced by hardware configurations, measurement techniques, mis-calibrations, etc. may be present in individual RSSI measurements. However, since the embodiments described here use a subtraction of consecutive measurements, one with the antenna on and other simply to measure RSSI value due to external noise, these errors do not play any significant role in the final outcome of the key fob location determination.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method of locating a key, the key is configured to communicate with a base station located within a vehicle through a plurality of antennas that are coupled to the base station, the method comprising:
    turning off each of the plurality of antennas, wherein the plurality of antennas include at least one antenna that is placed inside a passenger compartment of the vehicle and at least one antenna that is placed outside the passenger compartment of the vehicle;
    turning on only a first antenna of the plurality of antennas when the vehicle's engine is off;
    measuring a first received signal strength when the vehicle's engine is off;
    turning off the first antenna when the vehicle's engine is off;
    measuring a second received signal strength when the vehicle's engine is off;
    sequentially turning on each of the rest of the plurality of antennas when the vehicle's engine is off, one antenna at a time, and measuring at least one corresponding received signal strength when each respective antenna of the rest of the plurality of antennas is turned on; and
    determining that the key is physically present inside the passenger compartment of the vehicle and allowing the vehicle to be started only if a difference between the highest received signal strength, obtained from the first received signal strength and the at least one corresponding received signal strength, and the second received signal strength is above a preset threshold.

2. The method of claim 1, further comprising:
    allowing a second operation to be performed that is different from the starting of the vehicle if the difference between the highest received signal strength and the second received signal strength is above a second preset threshold but below the present threshold.

3. The method of claim 1, wherein the preset threshold is determined through a key calibration process and stored in the base station.

4. A system, comprising:
    an electronic key;
    a base station located within a vehicle; and
    a plurality of antennas that are electrically coupled to the base station, wherein the plurality of antennas include at least one antenna that is placed inside a passenger compartment of the vehicle and at least one antenna that is placed outside the passenger compartment of the vehicle, wherein the base station is configured to execute a received signal strength measurement sequence that includes turning off each of the plurality of antennas, turning on only a first antenna of the plurality of antennas when the vehicle's engine is off, instructing the electronic key to measure a first received signal strength when the vehicle's engine is off, turning off the first antenna when the vehicle's engine is off, instructing the electronic key to measure a second received signal strength when the vehicle's engine is off, sequentially turning on each of the rest of the plurality of antennas when the vehicle's engine is off, one antenna at a time, and instructing the electronic key to measure at least one corresponding received signal strength when each respective antenna of the rest of the plurality of antennas is turned on, wherein the system is configured to determine that the electronic key is physically present inside the passenger compartment of the vehicle and allowing the vehicle to be started only if a difference between the highest received signal strength, obtained from the first received signal strength and the at least one corresponding received signal strength, and the second received signal strength is above a preset threshold.

5. The system of claim 4, wherein the electronic key is configured to perform a received signal strength subtraction.

6. The system of claim 5, wherein the electronic key is configured to send a result of the subtraction to the base station.

7. A non-transitory computer readable medium storing programming instructions that when executed in a vehicle, perform an operation to locate a key, the key being configured to communicate with a base station located within the vehicle through a plurality of antennas that are coupled to the base station, the operation comprising:
- turning off each of the plurality of antennas, wherein the plurality of antennas include at least one antenna that is placed inside a passenger compartment of the vehicle and at least one antenna that is placed outside the passenger compartment of the vehicle;
- turning on only a first antenna of the plurality of antennas when the vehicle's engine is off;
- measuring a first received signal strength when the vehicle's engine is off;
- turning off the first antenna when the vehicle's engine is off;
- measuring a second received signal strength when the vehicle's engine is off;
- sequentially turning on each of the rest of the plurality of antennas when the vehicle's engine is off, one antenna at a time, and measuring at least one corresponding received signal strength when each respective antenna of the rest of the plurality of antennas is turned on; and
- determining that the key is physically present inside the passenger compartment of the vehicle and allowing the vehicle to be started only if a difference between the highest received signal strength, obtained from the first received signal strength and the at least one corresponding received signal strength, and the second received signal strength is above a preset threshold.

8. The non-transitory computer readable medium of claim 7, wherein the operation further comprising:
- allowing a second operation to be performed that is different from the starting of the vehicle if the difference between the highest received signal strength and the second received signal strength is above a second preset threshold but below the present threshold.

9. The non-transitory computer readable medium of claim 7, wherein the preset threshold is determined through a key calibration process and stored in the base station.

* * * * *